(12) United States Patent
Shepherd

(10) Patent No.: US 8,197,144 B2
(45) Date of Patent: Jun. 12, 2012

(54) APPARATUS FOR SUPPORTING A ROTATING SHAFT

(75) Inventor: Andrew Shepherd, Branston (GB)

(73) Assignee: Siemens Aktiengesellschaft, Munich (DE)

( * ) Notice: Subject to any disclaimer, the term of this patent is extended or adjusted under 35 U.S.C. 154(b) by 443 days.

(21) Appl. No.: 11/886,094

(22) PCT Filed: Mar. 9, 2006

(86) PCT No.: PCT/EP2006/060593
§ 371 (c)(1),
(2), (4) Date: Sep. 11, 2007

(87) PCT Pub. No.: WO2006/097428
PCT Pub. Date: Sep. 21, 2006

(65) Prior Publication Data
US 2008/0213086 A1 Sep. 4, 2008

Related U.S. Application Data

(63) Continuation-in-part of application No. 10/559,862, filed on May 23, 2006, now Pat. No. 7,497,628.

(30) Foreign Application Priority Data

Mar. 12, 2005 (GB) .................................. 0505162.8

(51) Int. Cl.
*F16C 17/03* (2006.01)
(52) U.S. Cl. ........................................ 384/309; 384/312
(58) Field of Classification Search .................... 384/99, 384/116–117, 119, 122, 132, 308, 309, 311–312
See application file for complete search history.

(56) References Cited

U.S. PATENT DOCUMENTS

| 3,711,169 | A | * | 1/1973 | Gardner | 384/309 |
| 3,905,250 | A | | 9/1975 | Sigg | |
| 3,994,541 | A | * | 11/1976 | Geary et al. | 384/117 |
| 4,097,094 | A | | 6/1978 | Gardner | |
| 4,300,808 | A | * | 11/1981 | Yoshioka | 384/312 |
| 4,337,985 | A | * | 7/1982 | Gerling | 384/132 |
| 4,457,634 | A | * | 7/1984 | Vinciguerra | 384/312 |
| 4,568,204 | A | * | 2/1986 | Chambers | 384/309 |
| 4,743,125 | A | * | 5/1988 | Dammel et al. | 384/119 |
| 5,205,652 | A | * | 4/1993 | Chapman | 384/119 |
| 5,288,153 | A | * | 2/1994 | Gardner | 384/311 |
| 5,455,778 | A | * | 10/1995 | Ide et al. | 703/1 |
| 5,549,392 | A | * | 8/1996 | Anderson | 384/119 |
| 5,603,574 | A | * | 2/1997 | Ide et al. | 384/119 |
| 5,634,725 | A | * | 6/1997 | Chester | 384/117 |
| 6,623,164 | B1 | * | 9/2003 | Gozdawa | 384/117 |
| 7,237,957 | B2 | * | 7/2007 | Geiger | 384/312 |
| 7,497,628 | B2 | * | 3/2009 | Shepherd | 384/309 |
| 2004/0240759 | A1 | | 12/2004 | Swann et al. | |

FOREIGN PATENT DOCUMENTS

GB 2402446 A * 12/2004

(Continued)

*Primary Examiner* — Marcus Charles

(57) ABSTRACT

An apparatus for supporting a rotating shaft comprising: a housing surrounding the shaft; interposed between the housing and the shaft a plurality of tilting pads which extend in contiguous manner circumferentially around the shaft, each tilting pad being able to rock in the rotation of the shaft; and interposed between each pair of adjacent tilting pads retaining means for preventing circumferential movement of the pads around the housing due to rotation of the shaft, wherein the physical relationship between at least one tilting pad and its adjacent retaining means is such that said rocking of the pad takes place without circumferential slippage of the pad around the housing.

4 Claims, 4 Drawing Sheets

FOREIGN PATENT DOCUMENTS

| | | |
|---|---|---|
| JP | 57113716 | 7/1982 |
| JP | 57195914 A | 12/1982 |
| JP | 01131811 A | 5/1989 |
| WO | WO 9322573 A1 * | 11/1993 |
| WO | WO 9505547 A1 * | 2/1995 |
| WO | WO 2004109132 A1 * | 12/2004 |

* cited by examiner

APPARATUS FOR SUPPORTING A ROTATING SHAFT

CROSS REFERENCE TO RELATED APPLICATIONS

This application is a continuation-in-part of U.S. application Ser. No. 10/559,862, filed May 23, 2006 now U.S. Pat. No. 7,497,628. This application is the US National Stage of International Application No. PCT/EP2006/060593, filed Mar. 9, 2006 and claims the benefit thereof. The International Application claims the benefits of British application No. 0505162.8 filed Mar. 12, 2005. Both the International application and the British application are incorporated by reference herein in their entirety.

FIELD OF INVENTION

This invention relates to an apparatus for supporting a rotating shaft.

More particularly, the invention relates to an apparatus for supporting a rotating shaft comprising: a housing surrounding the shaft; interposed between the housing and the shaft a plurality of tilting pads which extend in contiguous manner circumferentially around the shaft, each tilting pad being able to rock in the rotation of the shaft; and interposed between each pair of adjacent tilting pads retaining means for preventing circumferential movement of the pads around the housing due to rotation of the shaft.

The invention finds particular application in the support of rotors used in turbomachinery equipment, e.g. turbines, compressors, pumps.

BACKGROUND OF THE INVENTION

FIG. 1 shows a known apparatus 10 for supporting a rotating shaft. To the left of the figure apparatus 10 is shown partly assembled, to the right fully assembled, and at the bottom of the figure is shown a single tilting pad 14 of the apparatus. Thus, apparatus 10 comprises: (i) a tubular housing 12 along the axis A' of which in use of the apparatus a supported shaft (not shown) extends; (ii) carried by housing 12, and in use of the apparatus interposed between housing 12 and the supported shaft, five tilting pads 14 which extend in contiguous manner circumferentially around the shaft, each tilting pad being able to rock in known manner in the rotation of the shaft to accommodate vibration of the shaft; and (iii) interposed between each pair of adjacent tilting pads 14 a cylindrical retaining pin 20 for preventing circumferential movement of the pads around housing 12 due to rotation of the shaft. Indicated on the single tilting pad 14 shown at the bottom of FIG. 1 is the axis A of the pad. In known manner the radius R of each tilting pad 14 is somewhat smaller than the radius R' of tubular housing 12, see the partly assembled apparatus to the right of FIG. 1. This is so that each tilting pad 14 is able to rock as required within housing 12 to accommodate vibration of the supported shaft.

FIG. 2 illustrates rocking of a tilting pad 14 in use of apparatus 10. A supported shaft (not shown) rotates anticlockwise as indicated by arrow 22. Friction between the shaft and pad 14 causes pad 14 to be urged against cylindrical retaining pin 20. Rocking of pad 14 would tend to take pad 14 from its position shown in solid line to its position shown in dotted line. However, such unfettered rocking is prevented by abutment with retaining pin 20.

As shown in the exploded portion of FIG. 2, in the solid line position of pad 14 the right hand side of the pad abuts and runs parallel to the left hand side of cylindrical retaining pin 20. Rocking of pad 14 from its solid line position to its dotted line position would tend to move the right hand side of the pad as shown. Such movement is of course prevented by retaining pin 20. Thus, in order to rock, pad 14 slips circumferentially a distance Df around tubular housing 12 in a clockwise sense, i.e. in a sense opposite to that of rotation of the supported shaft. Distance Df is the distance in the circumferential direction between the solid and dotted line positions of the radially outer edge 24 of the right hand side of pad 14. Finally, when pad 14 is called upon to rock back to its solid line position, this again results in pad 14 slipping circumferentially the distance Df around housing 12, but this time in an anticlockwise sense.

The slippage back and forth of pad 14 circumferentially around housing 12 causes friction between the abutting faces of pad 14 and housing 12 with the result that there is premature wearing of the pad and housing.

SUMMARY OF INVENTION

According to the present invention there is provided an apparatus for supporting a rotating shaft comprising: a housing surrounding the shaft; interposed between the housing and the shaft a plurality of tilting pads which extend in contiguous manner circumferentially around the shaft, each tilting pad being able to rock in the rotation of the shaft; and interposed between each pair of adjacent tilting pads retaining means for preventing circumferential movement of the pads around the housing due to rotation of the shaft, wherein the physical relationship between at least one tilting pad and its adjacent retaining means is such that said rocking of the pad takes place without circumferential slippage of the pad around the housing.

Preferably, the shaft rotates in a first sense so as to urge said at least one tilting pad against one of its adjacent retaining means, and the physical relationship between the pad and this one retaining means is such that throughout said rocking of the pad the end of the pad in contact with the retaining means remains in contact thereby to prevent circumferential movement of the pad around the housing in said first sense due to rotation of the shaft.

Preferably, said one retaining means is elongate in form, and, in the region where said at least one tilting pad contacts the one retaining means, the one retaining means is circular in cross-section.

In a first apparatus to be described said one retaining means is a cylindrical retaining pin having a conical end, and throughout said rocking of the pad the inclined surface of the conical end follows the path taken by the radially outer edge of said end of the pad in contact with the retaining pin.

In a second apparatus to be described said one retaining means is a cylindrical retaining pin cylindrical along its entire length, and throughout said rocking of the pad said end of the pad in contact with the retaining pin follows the path taken by a part of an end of the retaining pin.

BRIEF DESCRIPTION OF THE DRAWINGS

The invention will now be described, by way of example, with reference to the accompanying drawings, in which.

DETAILED DESCRIPTION OF INVENTION

Figure 3:
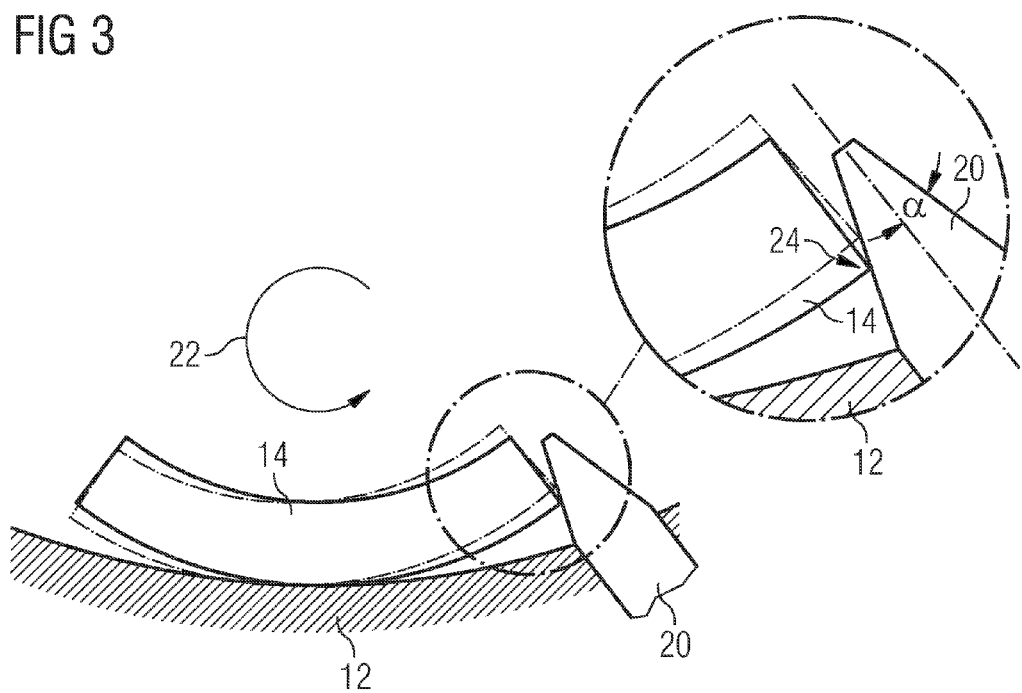
FIG. 3 illustrates part of a first apparatus for supporting a rotating shaft according to the present invention.

Referring to FIG. 3, in the first apparatus according to the present invention the cylindrical retaining pins 20 used have conical ends. The precise angle α of the inclined surface of the conical end depends on the path taken by radially outer edge 24 of the right hand side of tilting pad 14, as the pad rocks in unfettered manner between its solid and dotted line positions. The angle α should be such that the inclined surface follows the path taken by edge 24 as pad 14 so rocks.

By so forming the end of cylindrical retaining pin 20, edge 24 is permitted to move between its solid and dotted line positions without obstruction, thereby removing the need for slippage of pad 14 in the circumferential direction. In other words, in FIG. 2 the form of pin 20 is such as to permit only radial and not circumferential movement of edge 24 as pad 14 rocks, resulting in circumferential slippage of pad 14, whereas in FIG. 3 the form of pin 20 is such as to allow both radial and circumferential movement of edge 24, removing the need for the circumferential slippage.

It is to be noted that in FIG. 3, throughout its movement edge 24 remains in contact with the inclined surface of retaining pin 20, thereby at all times pin 20 prevents movement of pad 14 in an anticlockwise sense around housing 12 due to rotation of the supported shaft.

Figure 1:
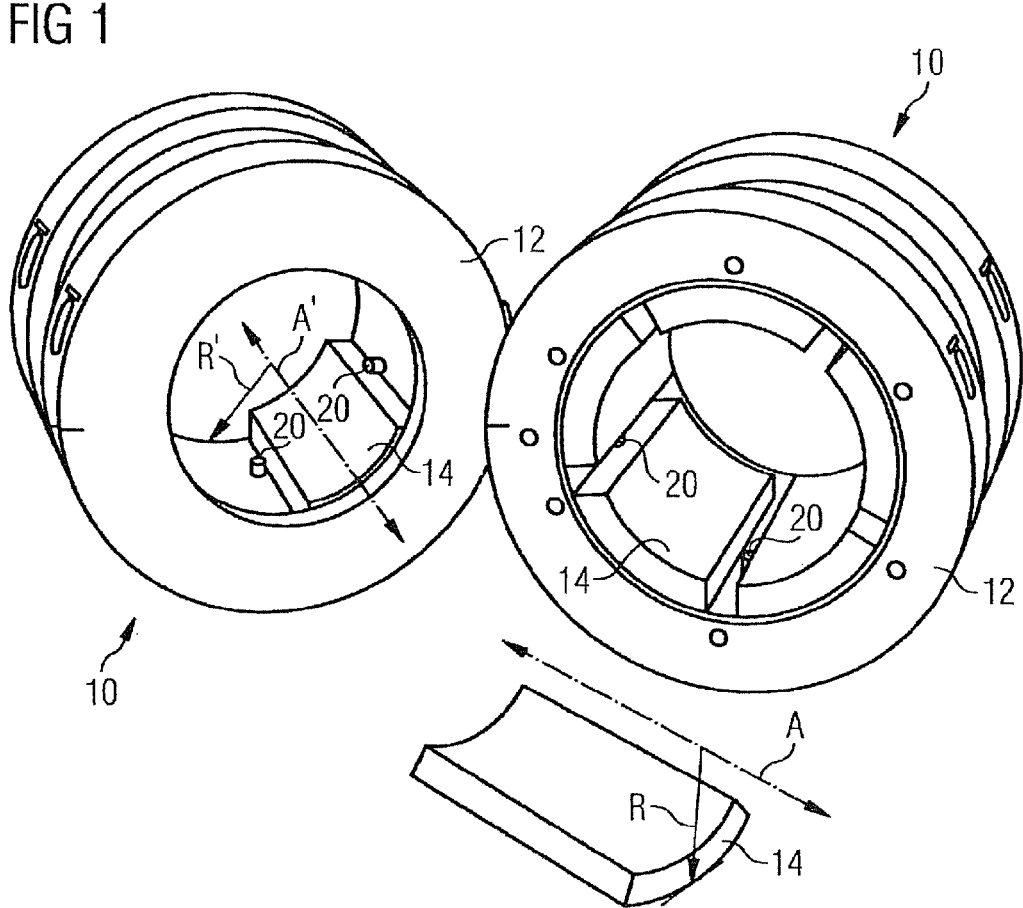
FIG. 1, already referred to, illustrates a known apparatus for supporting a rotating shaft.
Figure 2:
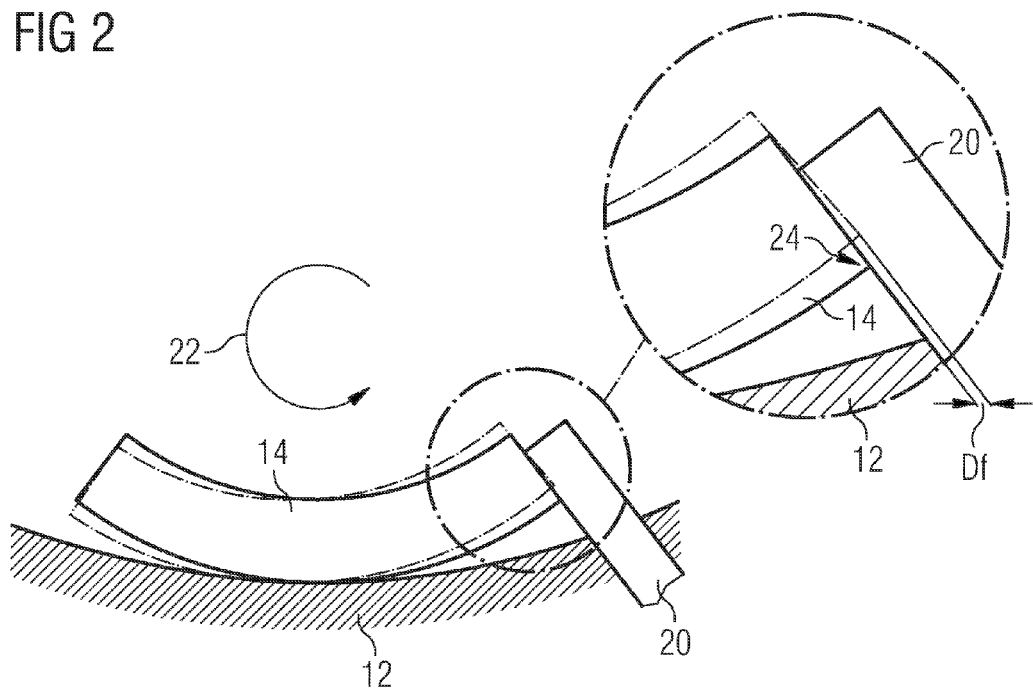
FIG. 2, also already referred to, illustrates rocking of a tilting pad in use of the known apparatus of FIG. 1.
Figure 4:
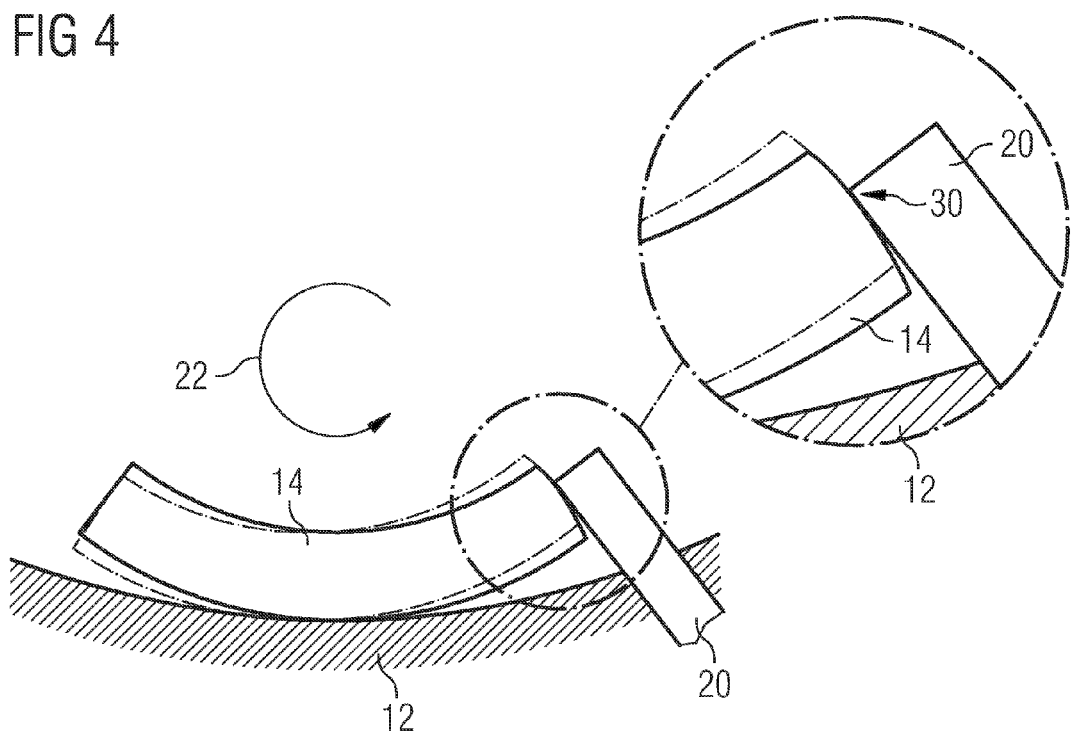
FIG. 4 illustrates part of a second apparatus for supporting a rotating shaft according to the present invention.

Referring to FIG. 4, in the second apparatus according to the present invention the cylindrical retaining pins 20 used are as in the known apparatus of FIGS. 1 and 2, i.e. cylindrical along their entire length, but the right hand side of tilting pad 14 is shaped so as to follow the path taken by that part 30 of the end of pin 20 which abuts pad 14, as pad 14 rocks in unfettered manner between its solid and dotted line positions.

By so shaping the right hand side of tilting pad 14, the pad is able to move between its solid and dotted line positions without obstruction, thereby removing the need for slippage of the pad in the circumferential direction.

It is to be noted that in FIG. 4, throughout its movement tilting pad 14 remains in contact with part 30 of cylindrical retaining pin 20, thereby at all times pin 20 prevents movement of pad 14 in an anticlockwise sense around housing 12 due to rotation of the supported shaft.

It is to be appreciated that FIGS. 3 and 4 represent opposite extremes as regards the shaping applied to tilting pad 14 and retaining pin 20 of FIG. 2. In FIG. 3 no shaping is applied to pad 14, all the shaping is of pin 20. In FIG. 4 no shaping is applied to pin 20, all the shaping is of pad 14. In between these two extremes both pad and pin would be shaped. The criteria to be met by the shaping would be as in the case of the two extremes: (i) the physical relationship between the pad and the pin must be such that rocking of the pad is able to take place without circumferential slippage of the pad around the housing; and (ii) at all times throughout its rocking the pad must remain in contact with the pin so as to prevent movement of the pad in an anticlockwise sense around the housing due to rotation of the supported shaft.

It is to be noted that in FIGS. 3 and 4, in the region where tilting pad 14 abuts retaining pin 20, pin 20 is circular in cross-section. This has the advantage that, if pin 20 rotates over time in use, there is still an appropriate physical relationship between pad 14 and pin 20, i.e. operation of the invention is not upset.

Figure 5:
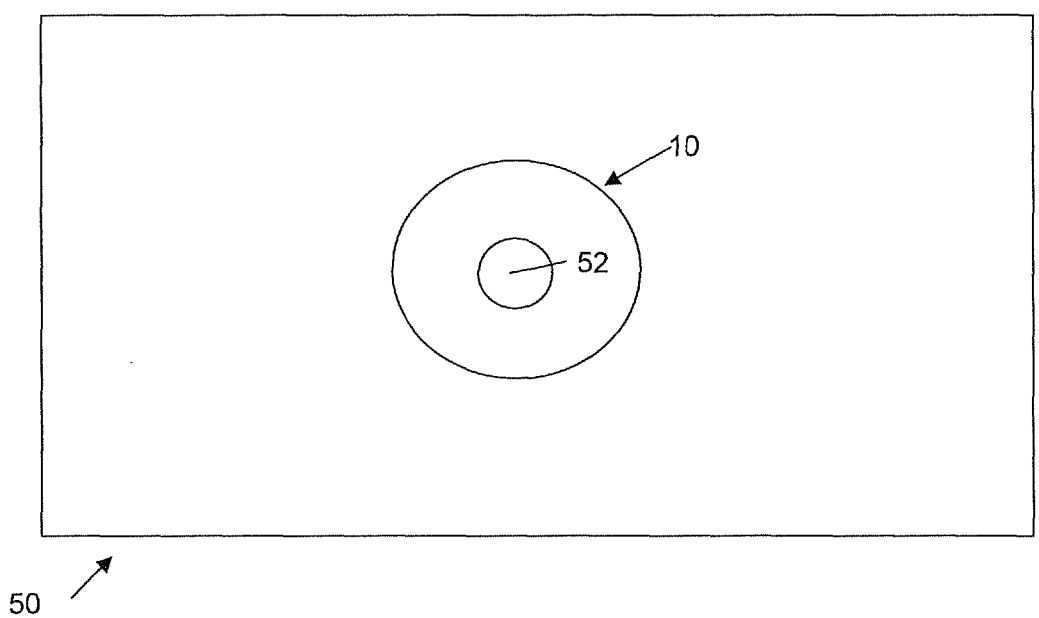
FIG. 5 illustrates the turbomachine with the housing as described in FIG. 1 and its corresponding rotor.

FIG. 5 illustrates the turbomachine 50 with the housing 10 as described in FIG. 1 and the corresponding rotor 52 of the housing.

The invention claimed is:

1. An apparatus for supporting a rotating shaft, comprising:
a housing surrounding the shaft;
a plurality of tilting pads arranged within the inner circumference of the housing between the housing and the shaft, the plurality of pads extend in contiguous manner circumferentially around the shaft wherein a space exists between adjacent tilting pads; and
a plurality of retaining devices each arranged between adjacent tilting pads in the space where the retaining devices prevent circumferential movement of the pads around the inner circumference of the housing due to rotation of the shaft, wherein rotation of a pad of the plurality of pads occurs without circumferential slippage of the pad around the inner circumference of the housing,
wherein the plurality of retaining devices are elongate in form, and, in a region where the at least one tilting pad contacts the one retaining device, the one retaining device is circular in cross-section,
wherein each retaining device is a cylindrical retaining pin having a conical end, and throughout the rotation of the pad the inclined surface of the conical end follows the path taken by a radially outer edge of the end of the pad in contact with the retaining pin as the pad rocks within the housing due to the vibration of the shaft.

2. The apparatus according to claim 1, wherein the shaft rotates in a first direction to induce at least one of the plurality of tilting pads against at least one of the adjacent retaining devices, and throughout the rotation of the pad an end of the pad in contact with the retaining device remains in contact to prevent circumferential movement of the pad around the housing due to rotation of the shaft.

3. Turbomachine, comprising:
a rotor shaft that rotates about a rotational axis;
a machine frame concentric with and surrounding the rotor shaft; and
a rotor shaft supporting device that comprises:
a housing surrounding the shaft, where the housing is supported by the machine frame;
a plurality of tilting pads arranged within the inner circumference of the housing between the housing and the shaft, the plurality of pads extend in contiguous manner circumferentially around the shaft wherein a space exists between adjacent tilting pads; and
a plurality of retaining devices each arranged between adjacent tilting pads in the space where the retaining devices prevent circumferential movement of the pads around the inner circumference of the housing due to rotation of the shaft, wherein rotation of a pad of the plurality of tilting pads occurs without circumferential slippage of the pad around the inner circumference of the housing,
wherein the plurality of retaining devices are elongate in form, and, in a region where the at least one tilting pad contacts the one retaining device, the one retaining device is circular in cross-section,
wherein the retaining device is a cylindrical retaining pin having a conical end, and throughout the rotation of the pad the inclined surface of the conical end follows the path taken by a radially outer edge of the end of the pad in contact with the retaining pin as the pad rocks within the housing due to the vibration of the shaft.

4. The Turbomachine according to claim 3, wherein the shaft rotates in a first direction to induce at least one of the plurality of tilting pads against at least one of the adjacent retaining devices, and throughout the rotation of the pad an end of the pad in contact with the retaining device remains in contact to prevent circumferential movement of the pad around the housing due to rotation of the shaft.

* * * * *